US012789769B2

(12) United States Patent
Augsburg et al.

(10) Patent No.: US 12,789,769 B2
(45) Date of Patent: Nov. 10, 2026

(54) VEHICLE STATE CONTROL SYSTEM, ROAD VEHICLE AND METHOD OF VEHICLE STATE CONTROL FOR EMISSION LIMITATION

(71) Applicant: TECHNISCHE UNIVERSITÄT ILMENAU, Ilmenau (DE)

(72) Inventors: Klaus Augsburg, Arnstadt (DE); David Hesse, Gerbershausen (DE); Vincenzo Ricciardi, Ilmenau (DE); Christopher Hamatschek, Erfurt (DE)

(73) Assignee: Volkswagen Aktiengesellschaft, Wolfsburg (DE)

( * ) Notice: Subject to any disclaimer, the term of this patent is extended or adjusted under 35 U.S.C. 154(b) by 108 days.

(21) Appl. No.: 18/547,368

(22) PCT Filed: Nov. 1, 2021

(86) PCT No.: PCT/DE2021/000178
§ 371 (c)(1),
(2) Date: Aug. 22, 2023

(87) PCT Pub. No.: WO2022/174849
PCT Pub. Date: Aug. 25, 2022

(65) Prior Publication Data

US 2024/0042977 A1 Feb. 8, 2024

(30) Foreign Application Priority Data

Feb. 22, 2021 (DE) ..................... 10 2021 000 919.3

(51) Int. Cl.
*B60T 8/172* (2006.01)
*B60T 8/32* (2006.01)
(Continued)

(52) U.S. Cl.
CPC .............. *B60T 8/172* (2013.01); *B60T 8/321* (2013.01); *B60W 40/12* (2013.01); *G08G 1/0112* (2013.01); *B60T 2270/406* (2013.01)

(58) Field of Classification Search
CPC .... B60T 8/172; B60T 8/321; B60T 2270/406; B60T 8/885; B60T 17/22; B60W 40/12; B60W 50/04; G08G 1/0112
See application file for complete search history.

(56) References Cited

U.S. PATENT DOCUMENTS 6,592,642 B2 7/2003 Maricq et al.
8,701,844 B2 4/2014 Tsiberids
(Continued)

FOREIGN PATENT DOCUMENTS

CN 108162970 A 6/2018
CN 109715453 A 5/2019
(Continued)

OTHER PUBLICATIONS

Machine Translation of CN 110329258 A PDF File Name: "CN110329258A_Machine_Translation.pdf" (Year: 2019).*
(Continued)

*Primary Examiner* — Grant Moubry
*Assistant Examiner* — Ruben Picon-Feliciano
(74) *Attorney, Agent, or Firm* — Laurence A. Greenberg; Werner H. Stemer; Ralph E. Locher

(57) ABSTRACT

An emission-limiting vehicle state control system includes a state detector, a database unit and a control and evaluation unit. The state detector is configured to provide state data. The database unit has a static database module, a dynamic database module and a data management module. The static database module includes static data for cause-effect relationships for emissions not associated with the drivetrain. The dynamic database module has variable data for emis-
(Continued)

sions not associated with the drivetrain. The control and evaluation unit is configured to receive the state data and the data basis data to determine an emissions budget and target emissions values with a calculation module. An assessment module chooses a final control command from the alternative preliminary control commands and outputs the final command to an actuator unit to influence a vehicle state.

10 Claims, 2 Drawing Sheets

(51) Int. Cl.
*B60W 40/12* (2012.01)
*G08G 1/01* (2006.01)

(56) References Cited

U.S. PATENT DOCUMENTS

| | | | |
|---|---|---|---|
| 9,688,194 | B2 | 6/2017 | MacNeille et al. |
| 10,300,902 | B2 | 5/2019 | Yen et al. |
| 10,449,966 | B2 | 10/2019 | Willimowski et al. |
| 10,800,393 | B2 | 10/2020 | Hecker et al. |
| 11,059,462 | B2 | 7/2021 | Hecker et al. |
| 2003/0139855 | A1 | 7/2003 | Hess et al. |
| 2022/0242408 | A1 * | 8/2022 | Namba .......... B60W 30/18154 |

FOREIGN PATENT DOCUMENTS

| | | | | |
|---|---|---|---|---|
| CN | 110329258 | A * | 10/2019 | .......... B60W 30/143 |
| DE | 202005006844 | U1 | 7/2005 | |
| DE | 202005017472 | U1 | 5/2006 | |
| DE | 102005006465 | A1 | 8/2006 | |
| DE | 102006051972 | A1 | 5/2008 | |
| DE | 102007009744 | A1 | 9/2008 | |
| DE | 60224858 | T2 | 1/2009 | |
| DE | 102009001332 | A1 | 9/2010 | |
| DE | 102016105135 | A1 | 9/2016 | |
| DE | 102015113587 | A1 | 2/2017 | |
| DE | 102015226647 | A1 | 6/2017 | |
| DE | 102016215900 | A1 | 3/2018 | |
| DE | 102018114743 | A1 | 12/2018 | |
| DE | 102017006349 | A1 * | 1/2019 | ............. B60T 17/22 |
| DE | 102018207298 | A1 | 11/2019 | |
| EP | 3289192 | B1 * | 6/2019 | ........ B60W 50/0097 |
| JP | 2008115957 | A | 5/2008 | |
| WO | 02053431 | A1 | 7/2002 | |
| WO | 2014072234 | A2 | 5/2014 | |
| WO | WO-2020031103 | A1 * | 2/2020 | ............. B60T 17/22 |

OTHER PUBLICATIONS

Machine Translation of EP3289192B1 PDF File Name: "EP3289192B1_Machine_Translation.pdf" (Year: 2019).*
Machine Translation of DE 102017006349 A1 PDF File Name: "DE102017006349A1_Machine_Translation.pdf" (Year: 2019).*
Machine Translation of WO2020031103A1 PDF File Name: "WO2020031103A1_Machine_Translation.pdf" (Year: 2020).*

* cited by examiner

VEHICLE STATE CONTROL SYSTEM, ROAD VEHICLE AND METHOD OF VEHICLE STATE CONTROL FOR EMISSION LIMITATION

FIELD AND BACKGROUND OF THE INVENTION

The invention relates to an emission-limiting vehicle state control system and a method for vehicle state control for limiting emission not associated with the drivetrain. Furthermore, the invention relates to a road vehicle with limited emission in terms of emissions not associated with the drivetrain.

Traffic-related emissions may exist as engine emissions, in particular as exhaust gases of internal combustion engines, and as non-engine emissions.

Both types of traffic-related emissions are subject to public criticism because they contribute to climate change and are classified as hazardous to health. For more than two decades, the European Union and the World Health Organisation have therefore been working to reduce particulate emissions by providing both guidelines and legislation. In order to reduce engine emissions, increasingly efficient drive systems were developed in the past, with particular emphasis on measures inside the engine itself or on aftertreatment systems.

Currently, a legal limit value for non-engine emissions does not exist and this has led to a continuous increase in this proportion of total emissions. Therefore, it is estimated that engine and non-engine emissions contribute to pollution in urban areas in comparable proportions today. Since a part of the wear particles can be assigned to the size classes of fine dust (≤10 μm), this source of fine dust is of particular relevance for human health.

Against this background, the UNECE has established the "Particle Measurement Programme" (PMP) to develop a standardized test procedure for the sampling and measurement of brake particles. For this reason, attention to this emission source increased in the past.

Various approaches to reduce emissions not associated with the drivetrain, especially emissions from friction brakes, are known from the state of the art.

On the one hand, the proposed solutions according to the prior art relate to collect the brake dust produced and thus avoid or reduce its emission into the environment.

For example, DE 10 2005 006 465 A1 describes a solution according to which the emitted brake dust is bound to components of the braking system by applying an electrostatic, magnetic or combined field. The components are cleaned by switching off the field.

JP 2008115957 A describes a proposal according to which an electrical potential is applied between the inside and outside of the rim in order to deposit brake particles on the inside of the rim.

DE 602 24 858 T2 discloses a brake abrasion collecting device by means of which an electric field is built up during braking to collect the brake dust on collecting plates.

Furthermore, DE 20 2005 006 844 U1 describes a device for collecting the abrasion of the friction blocks from braking systems of motor vehicles, which is characterized in that the brake dust is transported to a filter system via a flow guide and is filtered there.

DE 10 2006 051 972 A1 describes another brake dust collection device by means of which a housing partially encloses the area of the brake-caliper outlet so that the brake dust flows through an opening into the housing and deposits there thanks to an advantageous design of the housing.

In addition, in DE 10 2007 009 744 A1 a solution for the removal of brake dust is proposed according to which a suction device is connected to the exhaust system of the vehicle and the brake dust at the wheel brake is transported towards the exhaust system by the acting negative pressure and is deposited within a particle filter.

DE 20 2005 017 472 U1 also describes a concept for a brake dust absorption system which is characterized in that brake dust particles are extracted by suction by a device and with the support of an electrostatic field and deposited in a filter.

In WO 2014/072234 A2, an extraction device is described which sucks off brake dust through guide channels integrated in the brake lining and feeds it to a filter system.

The disadvantage of these solutions according to the state of the art is that, on the one hand, additional, complex extra devices prone to failure are required and, on the other hand, the problem of disposing of the retained brake dust in an environmentally compatible manner remains.

In addition, approaches are known that start one step earlier and aim to reduce the formation of brake abrasion.

DE 10 2018 207 298 A1 describes a control unit and a method for reducing the emitted amount of brake dust, wherein this method describes the determination of position data with respect to a position of the motor vehicle and the adaptation of a brake force distribution to the different brake devices mounted on the motor vehicle depending on the position data. The disadvantage of this disclosure is that this solution does not do meet the requirements of the complexity of the driving situation in practice.

Furthermore, DE 10 2009 001 332 A1 describes a solution for environmentally friendly cornering. In this publication, a method is proposed in which the course of a curve to be passed is determined, at least one target driving parameter is calculated for which an emission as low as possible caused by tyre abrasion, brake dust and carbon dioxide takes place and an actual driving parameter is approximated to the calculated target parameter. Here, the particular disadvantage is the fact that a solution is only shown for a specific driving situation.

DE 10 2016 215 900 A1 relates to a method for determining emissions of a vehicle and to a system for carrying out the method. According to this solution, it is provided that during the real driving operation emissions, depending on at least one vehicle parameter, are determined by means of a data processing device of the vehicle in a sensor-supported or model-based manner. The disadvantage of this approach is that only a solution is provided for determining emissions but not for reducing them.

Furthermore, WO 2020/031103 A1 discloses a method and a device for the recording and providing data for the evaluation of a braking behaviour, wherein the particulate emission serves as an indicator. These data are output to a driver of a vehicle so that the driver is able to optimize his/her driving style in such a way that fewer non-engine emissions are produced. The disadvantage is that emission-reducing driving behaviour is only encouraged and it still depends on the actual driving behaviour.

Another solution for reducing brake dust emissions is described in DE 10 2018 207 298 A1. In particular, it is proposed to distribute the braking force to different braking devices in a targeted manner on the basis of position data of the vehicle with the aim of reducing emissions. The disadvantage of the braking force distribution is that only one particular technical aspect is tackled, whereas other parameters are not taken into account.

SUMMARY OF THE INVENTION

It is the task of the invention to provide a vehicle state control system which makes, with respect to emissions not associated with the drivetrain, an emission-limited driving of a road vehicle possible, while at the same time the driving dynamics is optimized, and which is independent of the drive concept. Furthermore, it is the task to provide a road vehicle for such an emission-limited driving operation which is at the same time characterized by optimized driving dynamics as well as a method for such an emission-limiting and driving-dynamics-optimizing vehicle state control.

The task concerning the vehicle state control system is solved by the features listed in an independent claim. Furthermore, the task concerning the road vehicle is solved by the features listed in a dependent claim and concerning the method by the features listed in another dependent claim. Preferred further embodiments result from the respective subclaims.

The vehicle state control system according to the invention for limiting emissions not associated with the drivetrain is based in particular on the following considerations.

For the purpose of the present invention, emissions not associated with the drivetrain, hereinafter also referred to as non-engine emissions, are understood to be all particle emissions which are caused by a road vehicle and cannot be traced back to an engine combustion process. Emissions not associated with the drivetrain are in particular emissions from a friction brake and emissions from vehicle tyres. In a broader sense, they also include road abrasion and resuspension due to traffic-related turbulence.

The deceleration of road vehicles is currently still predominantly realized by the application of friction brakes which converts kinetic energy to thermal energy. The elimination of a friction brake is currently not possible due to the deceleration requirements in emergency braking situations, even for the case of battery electric vehicles with high recuperation power. Organic brake linings in combination with cast iron brake discs are to be considered the standard friction partners. The decisive frictional effect is taken over by contact areas which have a high compressive and shear strength and are usually implemented by fibre ends or single metal chips existing in the lining matrix. The particles leave the contact zone mainly under the effect of flow and inertia forces. This movement occurs partly tangentially in the direction of rotation, partly they are carried along in the circumferential direction at the boundary surface to the brake disc.

In addition to the initial speed or the frictional energy, the surface pressure and friction zone temperature are to be regarded as primary influencing variables on the particle-shaped wear at friction brakes. The particle formation process and the interrelationships involved are complex and depend in particular on the material properties of the friction partners being in tribological contact. Thus, in order to reduce the emissions caused by the vehicle wheel brake, special attention must be paid to the driving dynamics and the operating conditions in addition to material and design approaches.

Tyre and road particles can also be defined as the wear of the connected components, namely the tyre tread and the road surface. Wear can be described as the progressive removal of material from the top surface of a solid body due to tribological stress, i.e. the contact and relative movement of a corresponding counter body.

The main cause for the formation of tyre and road particles is slip. It is developing when the momentary vehicle speed is greater or less than the circumferential speed of the tyre. Slip can be divided into a deformation proportion of the tyre body and individual tread elements, i.e. the elastic deformation of the tyre sidewall, and a sliding proportion, i.e. the partial relative movement between the tyre surface and road surface. In addition to the abrasion of the tyre tread and the road surface due to slip, particles can also be released due to the evaporation and melting processes of the tyre tread at elevated temperatures. The latter can occur in the case of high sliding speed and low power transmission between wheel and road. Moreover, transversal slip, which is responsible for the transmission of lateral forces when cornering, can also be classified as a cause of particulate emissions.

The invention is further based on the consideration that a reduction of emissions not associated with the drivetrain can be achieved if an emission relevance of vehicle states, in particular of active control interventions, is made assessable depending on the situation and is included in a decision for a control of a motor vehicle state.

The invention is also based on the consideration that, when an emission budget is formed for a driving unit (i.e. a total route which includes a plurality of emission-relevant driving events), an allocation of the emission budget to the individual emissions of the driving events, taking into account the effects on the driving dynamics of the respective driving events, makes it possible to achieve better driving dynamics with the same total emission rather than only an evaluation of the emission relevance of individual driving events is carried out separately.

Overall, depending on the system under consideration, differentiated influencing variables for the formation of particulate wear can be defined, and the intensity and interactions with other influencing variables can be depicted or described using mathematical models or algorithms of machine learning. The description represents the basis for an optimal action in terms of emission, wear and driving dynamics with regard to acceleration and/or deceleration and/or transversal dynamics control.

For this purpose, the vehicle state control system has a state detection unit, a database unit and a control and evaluation unit as its basic components.

According to the invention, the state detection unit is designed to record state data. The state data are traffic situation data, vehicle state data or vehicle subsystem data.

The state detection unit has a plurality of detection units comprising the traffic situation detection unit, the vehicle state detection unit and the vehicle subsystem detection unit.

The traffic situation detection unit is designed to record the traffic situation data and provide them in a transmittable form. The traffic situation detection unit may in particular be implemented as sensors or systems for recording the behaviour of other road users, such as the speeds of other vehicles, the behaviour requirements of traffic control devices such as traffic lights or the spatial relationships of the traffic area, such as lane widths, distance to an intersection and the like. Furthermore, it can be remotely transmitted data, for example in the form of navigation data, weather data or, for example, traffic jam reports. Thus, the traffic situation detection unit detects externalities to the vehicle.

The vehicle state detection unit is designed to record the vehicle state data and to provide them in a transmittable form. The vehicle state data are in particular data on the driving dynamics of the vehicle, such as speed, acceleration in the direction of travel or transversal acceleration. For this purpose, the vehicle state detection unit has suitable sensors, too.

Finally, the state detection unit also has a vehicle subsystem detection unit which is designed to record the vehicle subsystem data and to provide them in a transmittable form. Such a vehicle subsystem can be, in particular, a friction brake or a vehicle tyre. The state of such a vehicle subsystem is represented by at least one physical variable, but preferably by several physical variables. Such a physical variable may be, for example, the temperature of a brake disc or the temperature of a tyre surface.

The database unit comprises a static database module, a dynamic database module and a data management module. Furthermore, the database unit is data-connected to the state detection unit and can receive state data from the state detection unit.

The static database module comprises static data on cause-effect relationships for emissions not associated with the drivetrain. They can be, for example, stored characteristic curves or maps. For example, the relationships between driving speed, temperature and particle emissions of a friction brake can be stored as a characteristic curve or map. The data stored in this way are based on experimental test series or field data and thus guarantee a high degree of reliability. These cause-effect relationships are generally valid and therefore they can serve as a static data basis.

The vehicle state control system according to the invention is characterized in particular by the dynamic database module and its interaction with the further components. The dynamic database module has variable data on emissions not associated with the drivetrain. Variable data on emissions not associated with the drivetrain are all data that do not have general validity as a static database and, depending on the situation, can be relevant to the emissions not associated with the drivetrain. Such variable data can be, for example, dynamically acting influencing values or data on a state history.

In the case of a dynamically acting influencing value, there may be, for example, a corrosive protective coating on a newly installed brake friction which changes the braking effect and the emission behaviour and is at the same time subject to increasing wear as a result of brake actuation.

Data on the state history can be, for example, climate data. If, for example, there is a high level of humidity over a longer period of time, it can be assumed that corrosion builds up on the surface of the brake disc and changes both the braking effect and the emission behaviour at the same time. In addition, the corrosion deposit is increasingly removed by brake application.

The variable data of the dynamic data module are thus data that, on the one hand, have a relevant influence on the emission behaviour but, on the other hand, are always only valid depending on the situation.

Another element of the database unit is the data management module.

This module is designed to write the variable data into the dynamic database module or to delete them. In this way, the data management module ensures that current situation-relevant data are available in the dynamic database module.

Furthermore, the data management module is designed to retrieve both the static data from the static database module and the variable data from the dynamic database module and to make them available to the control and evaluation unit as transferable database data. The static data and the dynamic data are thus referred to collectively as the date base data.

According to the invention, the data management module ensures that the control and evaluation unit also has database data available in addition to the status data and, in particular, that in addition to the static data the database data always include the variable data which are relevant to the respective situation.

According to the invention, the control and evaluation unit is data-connected both to the state detection unit and to the database unit. Moreover, it is designed to receive and process the status data from the status detection unit and the database data from the database unit. The state data and the database data are also referred to collectively as the input data.

As a result of processing the input data, the control and evaluation unit provides alternative preliminary control commands, wherein predictive emission parameters are assigned to the alternative preliminary control commands. The predictive emission parameters express the expected emissions not associated with the drive train that will be caused by the execution of the respective control command. For the calculation of the predictive emission parameters, the cause-effect-relationships are particularly important, as they are stored as static data in the static data module. These relationships can be, for example, the relationship between the temperature of the brake disc and the particle emission due to brake abrasion. The calculation of the predictive emission parameters also includes state data such as speed or variable data such as the total operating hours of a friction brake. Alternative preliminary control commands are understood to mean that, generally, several different conceivable control commands are calculated for the same state and are thus available in parallel for a subsequent evaluation.

The control and evaluation unit also comprises a calculation module. The calculation module is designed to calculate an emission budget for a driving unit from the state data and the database data.

In this context, a driving unit is understood to be the summing up of a plurality of individual driving events that are carried out in order to cover a certain distance with a vehicle from a starting point to a destination point. A driving event is understood to be a driving section of the driving unit that is delimited from a preceding driving section by one or more control interventions. The driving event is sometimes also referred to as a driving happening or driving section.

An emission budget can be based in particular on a specification defining the emission which is considered permissible per driving route. This specification can be defined, for example, by a vehicle manufacturer as a quality feature of the vehicle and stored in the database unit. Furthermore, it is conceivable that statutory provisions will also exist in this respect and are then stored in the database unit and can also be adapted in the event of any changes to the statutory provisions by changing the database data.

On the basis of the state data and the database data, the driving route can be determined by means of a route planner, for example after entering the starting point and the destination of a journey to be made, so that the length of the driving route is known. Then, the emissions budget can be calculated on the basis of the driving route. The emission budget is the sum of the emissions that may be emitted by the vehicle during the journey on this driving route.

Furthermore, the calculation module is designed to use the calculated emission budget to determine target emission parameters for the preliminary alternative control commands. This is based on the fact that geodata of the driving route, such as curve radii, gradients, data on the road surfacing and the like, as well as data on speed regulations, traffic lights, possible traffic jams and the like are known for the determined driving route from the state data and database data.

This allows to determine the alternative preliminary control commands for the individual driving events with the predictive emission parameters correspondingly assigned to them. The target emission parameters indicate the emission parameters that are available for a specific driving event so that they as a whole do not exceed the emission budget.

On this basis, the control commands can now be selected from the alternative preliminary control commands the assigned predictive emission parameters of which correspond to the target emission parameters. In this way, it is achieved that the sum of the predictive emission parameters of the selected control commands does not exceed the emission budget.

Advantageously, this also makes it possible to allocate the emission budget to the predictive emission parameters of the control commands in such a manner that the highest possible driving dynamics is achieved.

For this purpose, the control and evaluation unit according to the invention comprises an assessment module which is designed to select a final control command from the alternative preliminary control commands by means of a comparison of the predictive emission parameters with the target emission parameters.

The assessment module is based on the fact that different objectives of the vehicle state control, hereinafter referred to as control objectives, can be in a conflict of objectives. Such control objectives can be, in particular, the shortest possible driving time, the lowest possible consumption of energy sources or the lowest possible emission from sources not caused by the drivetrain. For example, a high degree of the target achievement of the control objective of a short driving time—hereinafter also referred to as high driving dynamics—is accompanied by a low degree of the target achievement of the control objective of low emission. A selection decision between different possible control commands will usually result in a compromise of the degrees of target achievements of the different control objectives. The assessment module is used to weight the control objectives. On the basis of the weighting, the assessment module can thus calculate which of the alternative preliminary control commands has the highest overall optimization effect for the weighted control objectives. Depending on the weighting, the highest overall optimization is achieved with different degrees of target achievements of the various control objectives so that a different alternative preliminary control command is usually selected with different weighting. It is particularly preferred that the weighting can be adjusted by the user so that, for example, a particularly low-emission vehicle operation can be selected and a somewhat longer driving time is then accepted. The control command selected according to the weighting is referred to as the final control command.

The assessment module is designed such that it determines the target achievement of the driving dynamics in the case of a different deviation of the predictive emission parameters from the target emission parameters, wherein the sum of the predictive emission parameters does not exceed the emission budget. This is always merely a different allocation of the emission budget. At the same time, different driving dynamics is achieved for the individual driving events, which are summed up as driving event-related individual driving dynamics results in an overall evaluation. The final control commands are then selected in such a way that the sum of the individual driving dynamics results leads to an optimized overall driving dynamics result. This means that the emission budget is allocated such that, on the one hand, the emissions may be higher in the driving events in which the relatively highest driving dynamics gain is achieved by increasing emissions and, on the other hand, to compensate for this, they must be lower in the driving events in which the emission reduction causes the relatively lowest driving dynamics loss.

After the selection has been made by the assessment module, the control and evaluation unit is designed to output the final control command to an actuator unit, wherein a vehicle state can be influenced by means of the actuator unit.

According to the invention, the final control command is output to an actuator unit. A control command is therefore to be understood as any output by means of which a specific condition of a subsequent technical unit is effectuated. In particular, it can be a direct switching command but also merely a data output. A control command in the sense of the present invention is also understood to be a non-command, i.e. the determination not to actively intervene in the vehicle state but, for example, to allow the vehicle to roll without acceleration or deceleration.

An actuator in the sense of the present invention is to be understood as any technical unit the condition of which is changed by an incoming control command. An actuator in the sense of the present invention is to be understood, first of all, as all units acting directly on a physical variable. An actuator is understood to be, for example, a direct actuation of a friction brake, the actuation of an eddy current brake or a control of an electric drive unit both in drive mode and in generator mode. Thus, for example, a vehicle deceleration can be effected by an adjustment of the absorbed torque in generator mode or also—alternatively or cumulatively—by an actuation of a friction brake. Furthermore, an actuator in the sense of the present invention is also understood to be any other technical system such as, for example, a vehicle subsystem or a further control and evaluation unit the operating condition of which is influenced by the control command and which thus indirectly influences the vehicle state.

Interaction with different vehicle systems, such as the drivetrain, is conceivable in order to ensure a control that is optimal for the driving situation. In the example of an electric drive concept, the kinetic energy of the vehicle in motion is converted into electrical energy, which in turn can be buffered. The deceleration torque required can be provided entirely by the electric drive unit in generator mode or also by coupling by means of a mechanical friction brake, wherein the advantage of a reduced number of applications of the friction brake, a reduction of brake pressure, friction power and friction zone temperature as well as a reduction of fine dust emissions coupled with said reductions is obtained as a result.

An essential advantage of the solution according to the invention is given by the fact that an emission reduction by means of limitation is already made possible by an intelligent driving dynamics control and without additional physical means.

In particular, the solution according to the invention advantageously makes it possible to take into account cause-effect-relationships, which are superordinate to driving situation classes, for reducing brake and/or tyre and/or road wear.

For example, the solution according to the invention makes it advantageously possible that a data processing and decision element does not output a vehicle acceleration that is optimal for the traffic flow and/or reasonable for the passenger, but that it outputs an acceleration at which, considering the driving situation, for example, a friction value at a low level resulting from the road surface, the drive slip is minimized so that the tyre wear is significantly reduced.

The integration of vehicle subsystems according to the invention, such as the use of the electric drive unit in the generator mode described above, advantageously provides a holistic control concept for the reduction of emissions not associated with the drivetrain.

The invention is aimed in particular at the increasing proportions of semi-autonomous and autonomous driving in the future, wherein situation-dependent driving decisions are implemented in a highly dynamic manner, but with the minimization of particulate emissions.

The state of the vehicle and the vehicle's environment is recorded and evaluated in real time by means of suitable sensors, cameras, motor vehicle-to-motor vehicle communication or motor vehicle-to-infrastructure communication or other state recordings. Calculation structures which calculate appropriately adapted output data on the basis of input data are provided for fully automatic guidance.

Taking into account cause-effect relationships between the momentary as well as the expected operating condition of the vehicle subsystem under consideration, such as the friction brake, with the formation of particulate emissions as a result of brake, tyre or road abrasion, the action of acceleration and/or deceleration and/or transversal guidance (steering) of the vehicle are/is evaluated and a control intervention and/or return of a digital value are/is implemented. In the case of autonomous or semi-autonomous driving of the vehicle, data on the traffic situation, driving state, vehicle subsystem data and cause-effect relationships are also recorded and/or provided in real time to determine an action that is optimal in terms of wear and driving dynamics.

The action optimal in terms of emission, wear and driving dynamics, which is calculated—depending on the traffic situation, driving state and vehicle subsystem data as well as on cause-effect relationships—by the control and evaluation unit as a data processing and decision element and which influences the further vehicle state of the vehicle under consideration, can be defined as a control intervention or as a return of a digital value for the control of vehicle systems, for example for deceleration control by means of an electric motor in generator mode, with regard to acceleration, deceleration and transversal dynamics, wherein, in addition to the data of the environment, data about the vehicle subsystem under consideration are also taken into account in the determination of the action which is optimal for wear and driving dynamics.

In this context, the solution according to the invention is not restricted to the objective to completely prevent emitted fine particulate matter, but also to ensure operating conditions with optimum effect, such as of the friction brake by temporary actuation to maintain an optimum operating range for the event of emergency braking situations, so that the driving decision can also be described as an action which is optimal in terms of emission, wear and driving dynamics.

It is particularly advantageous that, without an increase in emissions, higher driving dynamics can be provided by the formation of an emission budget and its optimized allocation to individual driving events, taking into account the effects on driving dynamics.

Furthermore, it is an advantage of the vehicle state control system according to the invention that it not only makes it possible to reduce the amount of fine particulate matter emitted by a friction brake but also to ensure optimum operating conditions, for example of the friction brake by temporary actuation to maintain an optimum operating range for the event of emergency braking situations.

The vehicle state control system according to the invention can advantageously provide emission reduction for both semi-autonomous and autonomous driving.

Semi-autonomous and autonomous driving of a vehicle are distinguished by the functions of the vehicle and the tasks of the driver or passenger.

Even in assisted driving, individual assistance systems can control speed, acceleration and deceleration depending on the vehicle in front.

In the case of autonomous driving, driving dynamics is controlled autonomously.

The vehicle state control system can provide emission-optimized operation for a vehicle of any design or drive concept, advantageously with an electric motor being an integrative component to ensure regenerative braking. This vehicle can be equipped with various sensors for detecting the driving situation, such as at least an ultrasonic sensor, a radar, a camera or sensors of other physical measuring principles for recording the condition of the environment.

In order to reduce particulate abrasion on vehicle tyres or the friction brake by changing the driving dynamics by means of acceleration or deceleration, the intensity of acceleration and braking torque can be particularly limited—also by using systems of the vehicle, such as the drivetrain for a deceleration in generator mode without actuating the friction brake—in dependence on a situation-determined control considering cause-effect relationships The solution according to the invention aims in particular at a compromise between driving dynamics/driving comfort and the acceleration, deceleration or transversal acceleration performances required for realizing the driving task, wherein the transversal acceleration performance is directly coupled to the particle formation process.

In addition, the vehicle state control system according to the invention is characterized by the advantage that it provides a control with the effect of an emission reduction without the need for a measurement of the real emissions of the vehicle.

Furthermore, there is the particular advantage that the emissions not associated with the drivetrain can be limited in a pre-definable manner. Depending on the limitation as a primary default, the optimum driving dynamics possible is achieved while this limit is maintained.

According to a first advantageous further development, the vehicle state control system is designed as a system according to SAE Level 2 to 5.

In this further development, the SAE levels are taken as a basis as follows:

SAE Level 2 is a partially automated level. Driving-mode-specific steering and acceleration or braking processes are executed by one or more driver assistance systems using information about the driving environment and with the expectation that the human driver carries out all remaining aspects of the dynamic driving task.

SAE Level 3 is a conditionally automated level at which the driving mode-specific execution of all aspects of the dynamic driving task is performed by an automated driving system with the expectation that the human driver will respond appropriately to a request from the driving system.

SAE Level 4 is a high level of automation. Here, all aspects of the dynamic driving task are performed by an automated driving system even if the human driver does not respond to a request from the driving system.

SAE Level 5 is a completely automated level, at which all aspects of the dynamic driving task are performed by an automated driving system. This applies under all driving and environmental conditions that can be handled by a human driver.

According to another further development, the vehicle subsystem is a braking system and/or a tyre system.

The braking system and the tyre system of a vehicle are the main sources of the emissions that are not associated with the drivetrain.

According to this further development, at least one physical variable of the braking system and/or of the tyre system is recorded by the vehicle subsystem detection unit of the state detection unit and included as part of the state data in the evaluation and the generation of control commands. Since the operating conditions of the braking system and the tyre system are particularly relevant for the emission behaviour, a particularly high reduction potential is achieved according to this further development. In particular, it is possible to monitor the temperature of the friction partners of the brake and, for example, to preventively regulate a reduced driving speed after a hazard braking with strong heating of the friction partners, so that critical temperatures of the friction partners are also prevented in the event of a renewed intensive brake actuation.

According to another further development, the vehicle state can be influenced by the braking system as a deceleration.

This further development is based on the fact that the braking system, as one of the main emission sources, is emission-effective, in particular when the brakes are applied to decelerate the vehicle.

Here, it is particularly advantageous that the control commands can be provided in such a manner that the deceleration is completely or partially caused by a generator operation of an electric drive unit. Furthermore, the control commands can advantageously be generated in such a way that high brake disc temperatures, which would lead to increased particulate emissions, are avoided.

According to another further development, the control and evaluation unit and the database unit form a structural unit. This unit is preferably a computer system with integrated data memories for recording the static and variable data. This structural unit can preferably be part of a control system of a vehicle.

According to another further development, data on a status history can be written into the dynamic database.

Data on a status history can, for example, be data on the brake actuations of recent periods. If, for example, the brakes have been applied in a particularly heavy manner with the temperature of the friction partners being high at the same time, it can be assumed that there has been a thermally induced surface change, particularly of the brake linings. This change has an effect on both the braking behaviour and the emission behaviour. Since these cause-effect relationships are stored as further data in the database, this can be included in the generation of the control commands with the effect of an emission reduction.

According to a further advantageous further development, the control and evaluation unit is designed to evaluate an emission-related degree of fulfilment of a previous final control command by means of the status data and to update the variable data by means of the data management module.

Advantageously, this further development makes it possible to design the vehicle state control system as a self-learning system. In this design, it is recorded how the status data, in particular the vehicle status data and the vehicle subsystem data, have changed when a control command was issued. In this way, the emission and thus the emission-related degree of fulfilment can be indirectly evaluated by taking into account the data and cause-effect relationships. Then, the data management module writes the additional data obtained in this way as variable data into the dynamic database. Thus, the database of variable data is continuously optimized so that the control interventions are carried out by control commands such that the emissions are further reduced.

For example, it may be the case that a vehicle tyre with optimized rolling resistance is mounted to increase the range of, for example, an autonomously driving battery-electric vehicle, wherein the maintenance of the frictional connection due to increased transversal acceleration can lead to an increase in tyre wear, particularly when cornering. Advantageously, the driving dynamics control can thus be optimized by using neural networks and on the basis of the updating of the variable data in the dynamic database in the sense of a learning element, taking into account driving state and vehicle system data, for example for the case of a tyre and/or brake and/or road change, wherein vehicle subsystem data, such as ABS or ESP, are also used for training to evaluate the specific driving situation. Accordingly, the vehicle dynamics control is trained to new conditions.

In order to make a decision on the selection of a final control command, information on the emission-related benefit is required as a reward in order to be able to evaluate the actions caused by a control command. This information is provided by the database unit, which in particular has the dynamic database module as a learning element for this purpose. The information on the emission-related benefit can be available as a mathematical model in order to predict the particle release resulting from an action, such as the abrasion on the friction brake, tyres or road surface. Machine learning algorithms can be applied, which take into account branched correlations, for example, between the tribological properties, the lining composition and the environmental and test conditions. It is conceivable to input the information by a learning process.

The control and evaluation unit can evaluate the action caused by the control commands and calculate which process leads to the greatest possible success. This makes it possible to achieve long-term improvements in the actions. Furthermore, the advantageous further development makes it possible to select an action which is to be carried out on the basis of observations of the environment and is compared and evaluated with a predefined standard.

The variable data of the dynamic database module provide a memory to the vehicle state control system enabling it to memorize the current state of the environment. If the environment is only partially observable, an internal model of the state of the environment can be created with the help of the available information. Based on this model, the control and evaluation unit can provide optimized control commands.

According to a further aspect, the invention relates to a road vehicle which has a friction brake and comprises a vehicle state control system according to any of the preceding claims. With respect to the vehicle state control system as a feature of such a road vehicle, reference is made to the related description sections to the preceding claims.

Such a road vehicle according to the invention has the particular advantage that, during the operation of the road vehicle, the particulate emission can already be reduced by controlling the vehicle states without the need for additional constructional measures.

A method according to the invention for vehicle state control by means of a vehicle state control system pursuant to the claims includes the following process steps:

a) writing static data as parametrization into the static database module, b) recording state data by the state detection unit and providing them for transmission, c) obtaining state data from the state detection unit and database data from the database unit by the control and evaluation unit, d) providing alternative preliminary control commands and assigning predictive emission parameters to the alternative preliminary control commands by the control and evaluation unit, e) calculating an emission budget of a driving unit from the state data and from the database data, f) calculating target emission parameters from the emission budget, g) selecting a final control command from the alternative preliminary control commands by comparing the predicted emission parameters and the target emission parameters, h) outputting the final control command to an actuator unit and affecting a vehicle state, i) writing and/or deleting variable data of the dynamic database module by the data management unit.

The contents of the description of the mode of operation of the vehicle state control system also apply in a corresponding manner to the method according to the invention. The marking of the process steps by letters is used for the purpose of identification and designation and does not specify any sequence. The sequence of the process steps results from the accompanying description.

The process steps are described in detail below.

a) Writing static data as parametrization into the static database module

In process step a), the static data are stored in the static database module. This process step precedes regular operation and has to be carried out only once. Then, the regular operation begins with the following process step b).

b) Recording state data by the state detection unit and providing them for transmission In this process step, the state detection unit, which is formed by the traffic situation detection unit, the vehicle state detection unit and the vehicle subsystem detection unit, records state data such as the position of other road users, the speed of the vehicle or the tyre pressure.

c) Obtaining state data from the state detection unit and database data from the database unit by the control and evaluation unit In this process step, the state data from the state detection unit and the database data from the database unit are transmitted to and received by the control and evaluation unit. Thus, all data are available for evaluation.

d) Providing alternative preliminary control commands and assigning predictive emission parameters to the alternative preliminary control commands by the control and evaluation unit In process step d), the data are evaluated and the alternative preliminary control commands are provided. In addition, predictive emission parameters from which the emission effect of the control command in question is derived are assigned to these control commands.

e) Calculating an emission budget of a driving unit from the state data and the database data In this process step, the calculation module of the control and evaluation unit calculates an emission budget. The emissions budget is the sum of the emissions permitted to be emitted for the respective driving unit. The amount of the emission budget results from a default value that is stored in the database unit. This default value can be given, for example, as an emission quantity per kilometre or it can optionally also be adjustable by the driver.

f) Calculating target emission parameters from the emission budget

In this step, the emission budget is allocated to the individual driving events so that a target emission parameter is created for each driving event. The target emission parameter specifies the maximum emission quantity for the respective driving event in order not to exceed the emission budget in total.

g) Selecting a final control command from the alternative preliminary control commands by comparing the predictive emission parameters and the target emission parameters Subsequently, in process step g), a control command is selected as the final control command from the several alternative preliminary control commands, wherein the selection is also carried out on the basis of a comparison of the predictive emission parameters and the target emission parameters. Thus, for example, the control command can be selected from several possible control commands as the final command the associated predictive emission parameter of which, considered on its own, does not exceed the corresponding target emission parameter. Furthermore, an optimization can also be carried out by means of the comparison of this process step in such a way that a control command is permitted the associated predictive emission parameter of which, considered on its own, exceeds the corresponding target emission parameter, if this is compensated for by one or more other control commands with their associated emission parameters and if the sum of the individual driving dynamics results achieved in this way is greater than the sum of the individual driving dynamics results in the case of a selection of the control commands only by the evaluation of each driving event on its own.

(h) Outputting the final control command to an actuator unit and affecting a vehicle state In process step h), the final control command generated according to the previous process steps is output to an actuator unit. The actuator unit, for example an electric drive unit in generator mode, effects a change in the vehicle state, here for example as a deceleration to reduce the speed.

i) Writing and/or deleting variable data of the dynamic database module by the data management unit In process step i), variable data are written and/or deleted. This process step offers the particular advantage of the method according to the invention that, in addition to the static data, situation-relevant variable data are also available and are included in the generation and selection of control commands and help to further optimize their emission effects. At the same time, the static database can be relieved, since the storage of particularly complex characteristic diagrams for emission-relevant cause-effect relationships, which requires a lot of memory capacity and is associated with high data collection costs, can be dispensed with.

The marking of the process steps with letters serves the purpose of designation and does not specify a compulsory sequence. With regard to the sequence, process steps a) to f) are carried out in the order listed, whereas process step g) is not subject to any specification of the sequence.

In an advantageous further development of the method, process steps a) to i) are carried out repeatedly first. Furthermore, this further development additionally comprises the following process steps:

j) recording actual emission parameters of final control commands already issued in the driving unit, k) including the actual emission parameters in the emission budget and calculating a residual emission budget for a residual driving unit, (l) calculating updated target emission parameters from the residual emission budget, m) selecting the final control command from the alternative preliminary control commands by means of a comparison of the predictive emission parameters with the updated target emission parameters.

The present advantageous further development of the method is characterized by the fact that a continuously renewed emission budget calculation is carried out by subtracting the already consumed emission budget from the initially calculated emission budget and allocating the resulting residual emission budget to the driving events of the residual driving unit. This is based on the fact that control commands with their correspondingly assigned actual emission parameters, which could not be included during the initial execution of the process steps d) to h), because they are derived, for example, from unpredictable state data, in particular unpredictable traffic situation data, must also be selected. These unpredictable data can be, for example, an emergency braking due to a pedestrian starting to go onto the road. Conversely, in special cases, lower actual emission parameters may also be given, for example, if traffic-related slow driving occurs. In this case, there is an emission credit that can be used for the driving events of the remaining driving unit in favour of higher individual driving dynamics results.

The specified additional process steps of the advantageous further development are described in more detail below.

j) Recording actual emission parameters of final control commands already issued in the driving unit In process step j), the emissions which have already been caused during the driving unit are recorded. According to the invention, this is done as a particular advantage not by real measurements but on the basis of the predictive emission parameters that are assigned to the issued final control commands. Therefore, actual emission parameters in the sense of the present invention are understood to be the predictive emission parameters of the control commands that have actually been executed.

k) Including the actual emission parameters in the emission budget and calculating a residual emission budget for a residual driving unit According to process step k), the actual emission parameters are subtracted from the emission budget, resulting in a residual emission budget that is available for the residual driving unit. The residual driving unit is the sum of the driving events that remain after deducting the driving events already carried out by the driving unit. The residual emission budget is thus the basis for a planning update that enables an adjustment of unforeseen emission deviations of the already executed driving events.

l) Calculating updated target emission parameters from the residual emission budget The process step l) principally corresponds to the process step f); however, the basis for the calculation of the target emission parameters is now only the residual emission budget. Updated target emission parameters are understood to be those emission parameters the calculation basis of which is a residual emission budget. In all other respects, the description contents for process step f) apply here in a corresponding manner.

m) Selecting the final control command from the alternative preliminary control commands by means of a comparison of the predictive emission parameters with the updated target emission parameters The process step m) principally corresponds to the process step g); however, the comparison to be carried out here refers to the predictive emission parameters of the control commands for the residual driving unit and to the updated target emission parameters. In all other respects, the contents of the description of process step g) apply here in a corresponding manner.

The process step h) is described in the following.

The invention is illustrated as an exemplary embodiment by means of the following figures.

DETAILED DESCRIPTION OF THE INVENTION

Figure 1:
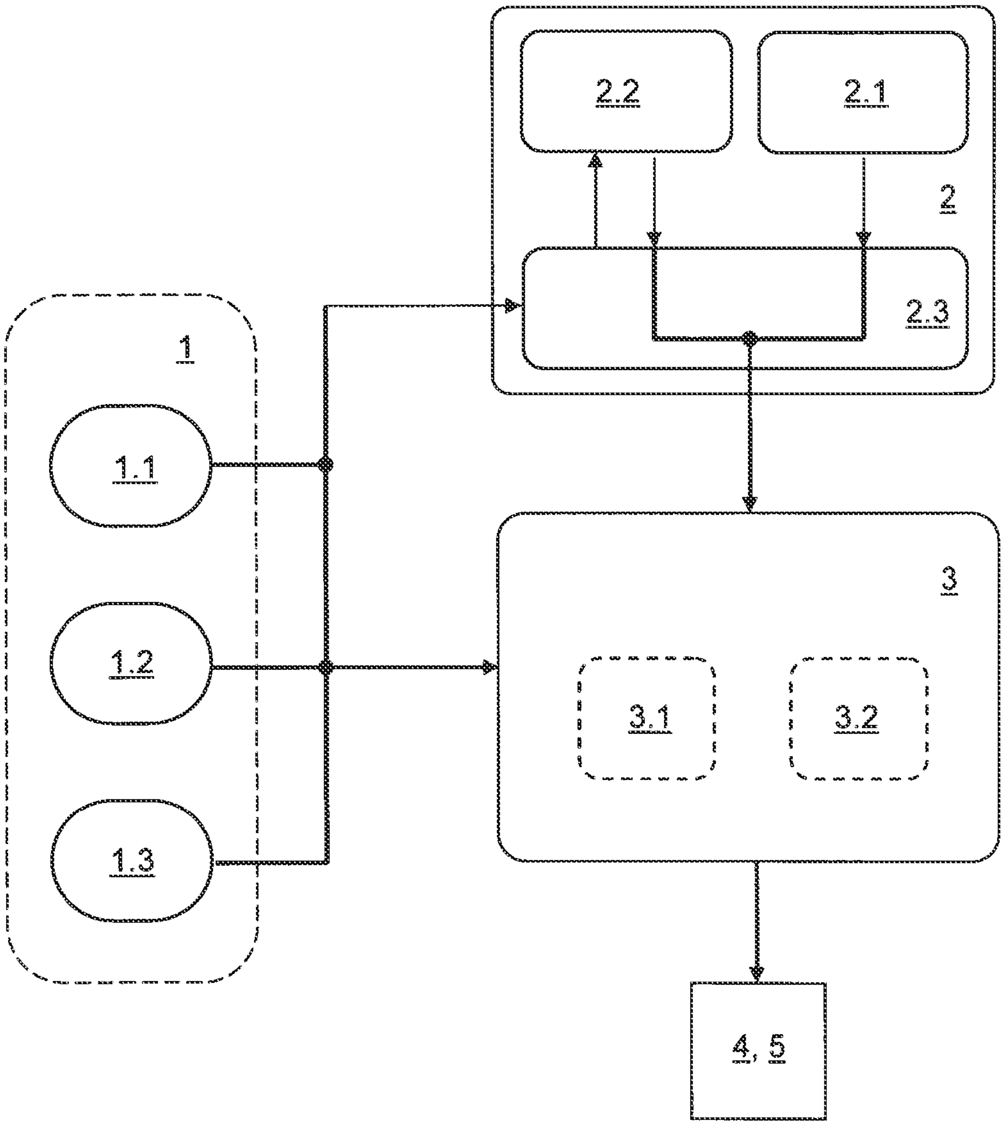
FIG. 1 Block diagram of the vehicle control system

The use of the reference numerals in the figures and in the associated description sections is consistent in the following, even if not all figures are provided with all reference numerals.

FIG. 1 shows an exemplary embodiment of a vehicle control system according to the invention in a block diagram.

The evaluation unit 3 and the database unit 2 are combined in one structural unit as an electronic circuit of a computer with processor and data memory. Here, static data are stored in the static database module 2.1. Furthermore, the database unit 2 comprises the dynamic data management module 2.2. The data management module 2.3 controls both the writing of variable data into the dynamic database module 2.2 and the reading of static data from the static database module 2.1 and of variable data from the dynamic database module 2.2 so that both static and variable data are available as database data for the control and evaluation unit 3.

In addition, there is a structurally distributed state detection unit 1, which has a traffic situation detection unit 1.1, a vehicle state detection unit 1.2 and a vehicle subsystem detection unit 1.3. The state detection unit records data, in particular, on the distance and relative speed to other road users, on the vehicle's own speed, on the temperatures of the tyres and the brakes, as well as other data, such as position or navigation data, as state data. The control and evaluation unit 3 receives this state data via the data link.

Thus, the control and evaluation unit 3 has both the database data and the state data at its disposal for evaluation, for determining the driving events of a driving unit, i.e. a driving route, and for providing possible preliminary control commands.

The control and evaluation unit 3 determines preliminary alternative control commands and assigns to them, as predictive emission parameters, an indication about the emissions that are to be expected when the respective control command is executed.

The control and evaluation unit 3 comprises a calculation module 3.1 as an important component. In the exemplary embodiment, the calculation module 3.1 calculates a driving route and the driving events associated with this driving route on the basis of the state data and the database data, starting from a predefined starting point and a predefined destination point. Furthermore, a permissible kilometre-related emission quantity is stored in the exemplary embodiment. Based on the driving route, the emission budget is calculated and allocated to the driving events so that target emission parameters result for the preliminary alternative control commands.

The control and evaluation unit 3 also includes an assessment module 3.2 which, in a comparison of the predictive emission parameters with the target emission parameters, weights target achievement levels with regard to emissions and driving dynamics in an overall assessment of the driving events for the driving unit as a whole so that a final control command can be selected from the preliminary control commands and then output. The final control command optimizes the different target achievement levels while ensuring that the total of the individual emissions of the driving events does not exceed the emission budget, wherein the emissions are allocated in such a way that the best possible total driving dynamics result is achieved.

The final control command acts on the actuator unit 4.

In addition to the control and evaluation unit 3, the data management module 2.3 is also data-connected to the state detection unit 1 and can thus provide the writing of variable, in particular only temporarily relevant data from the state data into the dynamic database module 2.2. In this way, the data management always ensures an up-to-date stock of such variable data that may be relevant for the provision of control commands and emission parameters.

Figure 2:
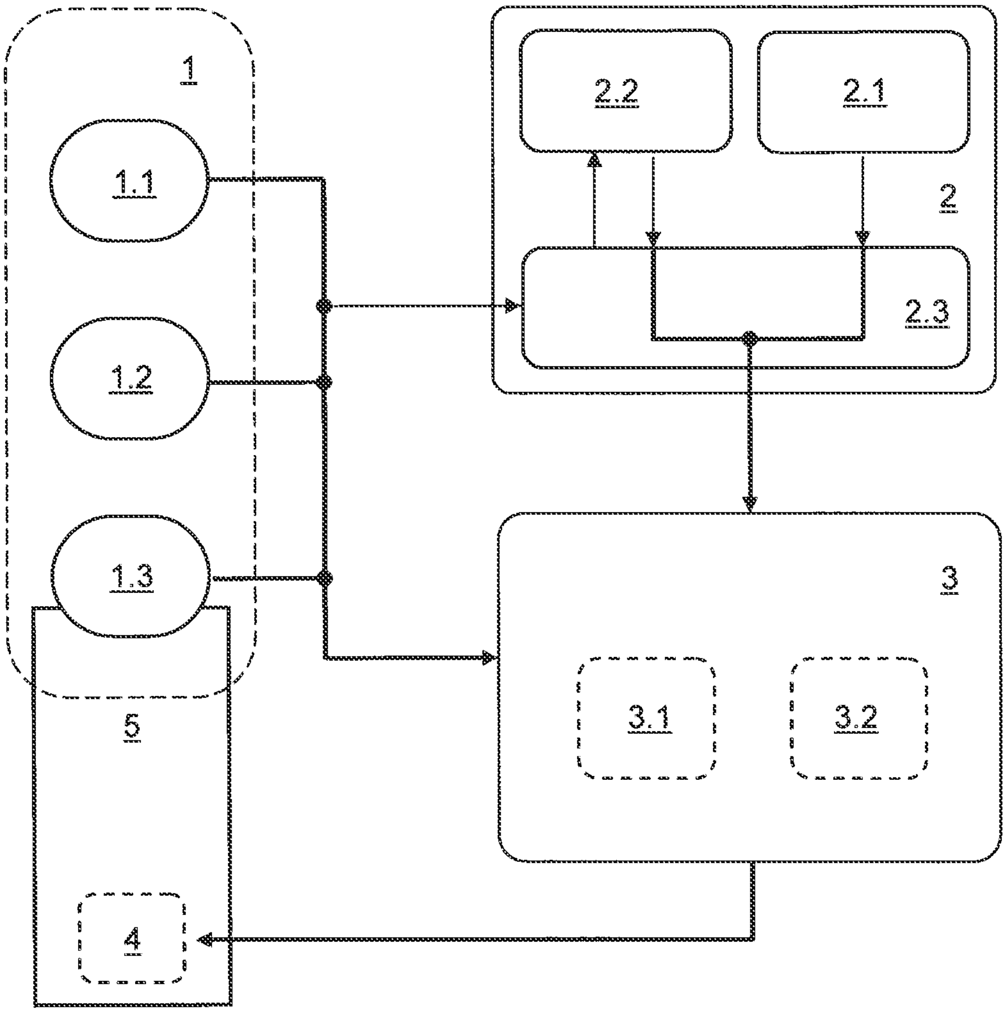
FIG. 2 Block diagram of the vehicle control system with braking system as a vehicle subsystem.

FIG. 2 shows a modified exemplary embodiment of the vehicle state control system.

It corresponds predominantly to the exemplary embodiment in FIG. 1 so that reference is made to the contents of this description.

The final control command acts on the actuator unit 4, which is designed as a part of a braking system 5 in the exemplary embodiment shown in FIG. 2. The braking system 5 also represents a vehicle subsystem from which vehicle subsystem state data are recorded by a vehicle subsystem detection unit 1.3.

A first exemplary embodiment of the method according to the invention relates to a cornering driving unit which, for the sake of simplicity, has a straight-ahead driving, a cornering and then again a straight-ahead driving as driving events.

Decisive for the wear of a tyre are the acting forces, which occur depending on the driving situation.

In the case of straight-ahead driving, the forces to be transmitted between the tyres and the road are substantially generated exclusively by acceleration, which can be an acceleration in the narrower sense and a deceleration.

In the case of cornering, a transversal force is produced by the centripetal acceleration, which is influenced in particular by the vehicle speed, the curve radius and the vehicle mass. The inertia force is opposed to the vehicle acceleration. In order for the vehicle to be capable to pass the curve radius as a function of the speed specified by the driver or, in the case of automated or autonomous driving specified by the vehicle, transversal guidance forces must be transmitted at the front and rear wheels, which in turn are influenced by the slip angle, wheel load, slip, friction value and also the wheel camber. An increase in tyre-related emissions and tyre wear rate is associated with the transfer of forces.

This shows clearly that the forces to be transmitted by the tyre and the correlating wear rate are greater the more a vehicle accelerates and decelerates and the faster a vehicle passes a curve. Emissions additionally occur during heavy deceleration due to the actuation of a friction brake required for this action, which is not the case during acceleration.

In process step a), the cause-effect relationships described above are written into the static database module 2.1 of the database unit 2 along with other data before the start of the driving operation and thus they are available for evaluation.

Further information required for evaluation and decision-making is recorded and made available as state data by the state detection unit 1 in process step b). In the exemplary embodiment, this is in particular data about the characteristics of the curve to be passed, which are obtained as navigation data from map material or from the route information. Specifically, this is, for example, information about the radius of the curve, the permissible maximum speed and the road surface. The vehicle position can be determined via GPS. Information about the tyre as a vehicle subsystem is provided, for example, by the tyre pressure, which is determined by means of suitable sensors in the relevant vehicle subsystem detection unit 1.3. Furthermore, information on a vehicle ahead, for example detected by radar, can be provided as traffic situation data.

In process step c), the control and evaluation unit 3 thus receives both database data from the database unit 2, in particular on the cause-effect relationships, and state data from the state detection unit 1.

On this basis, the control and evaluation unit 3 evaluates and provides alternative preliminary control commands by assigning predictive emission parameters in process step d). Alternative preliminary control commands are determined in the exemplary embodiment as follows.

For straight-ahead driving, moderate acceleration up to a moderate speed, constant maintenance of the moderate speed and then moderate deceleration with actuation of the friction brake until the curve section is reached is determined as the first possible sequence of control commands. Higher acceleration up to a higher speed and subsequently, without a phase of constant speed maintenance, slight deceleration with recuperation and without actuation of the friction brake is determined as a second possible sequence of control commands. On the basis of the database data, an assumed emission quantity is assigned to each of the possible control commands as a predictive emission parameter.

For cornering, a first possible control command is determined as an actuation of the friction brake before reaching the curve in order to reduce the speed. A second possible control command is determined as cornering without prior speed reduction. In the case of the first control command, the expected particle emission caused by the friction brake and the expected emission caused by tyre abrasion at the reduced cornering speed are calculated on the basis of the stored cause-effect relationships and assigned to the first control command as a predictive emission parameter. In the case of the second control command, the particle emission due to the friction brake is omitted; instead, there is an increased emission due to tyre abrasion because of the higher cornering speed. This is assigned to the second control command as an emission parameter.

Furthermore, the calculation module 3.1 calculates an emission budget for the whole driving unit in process step e), and in the present exemplary embodiment this emission budget results in a simplified manner from the route length and a stored emission quantity per kilometre. Based on the emission budget, which is available for all driving events, an allocation to the driving events is carried out in process step f) so that target emission parameters are available.

A comparison of the determined target emission parameters and the predictive emission parameters of the determined alternative preliminary control commands results in step g) in the determination which control commands have the associated predictive emission parameters that do not exceed the target emission parameters.

In process step g), depending on the result of the comparison of the emission parameters, the control and evaluation unit also selects the final control command both for straight-ahead driving and for cornering from the possible control commands shown.

Furthermore, in the exemplary embodiment, a driving dynamic parameter is assigned to the preliminary alternative control commands during the comparison. A comparison based on the ratio of the emission parameters to the driving dynamics parameters is also carried out here. The selection of the final control commands takes into account which control commands achieve the highest driving dynamics parameters in total and their total predictive emission parameters comply with the emission budget at the same time. Here, individual predictive emission parameters can exceed the corresponding target emission parameters, if other predictive emission parameters compensate this by less emission compared to the relevant target emission parameters. For example, a higher emission due to high acceleration that leads to high driving dynamics can be compensated by less emissions due to slighter deceleration over a longer distance and subsequent slower cornering without additional braking intervention which leads to a better overall driving dynamics result.

Furthermore, the selection of the final control commands takes into account whether, for example, the generation of particle emissions by the friction brake is partially, fully or overcompensated by lower tyre abrasion emission. If, for example, overcompensation is reality, the control command for friction brake actuation to reduce the speed is selected as the final control command. Conversely, in the case of partial compensation, the final control command is the control command without brake actuation. In the case of full compensation, there is practically emission neutrality between the possible control commands; therefore, the control and evaluation unit also selects the control command without brake actuation as the final control command in favour of a better level of target achievement with regard to a short driving time, i.e. a high driving dynamics. In a modification of this evaluation example, a threshold value or a characteristic curve is also stored in the assessment module 3.2 and indicates to which extent a slightly increased emission is accepted in favour of significantly better driving dynamics when selecting the final control command.

The final control command is then transmitted to the braking system as a control command in process step h) and thus causes, in the event of a brake actuation, a change in the vehicle state through deceleration.

In this exemplary embodiment, the vehicle speed, with which the transversal acceleration and the tyre-related emission rate correlate, is determined in an optimized manner in terms of wear, emission and driving dynamics, taking into account the available information.

REFERENCE NUMERALS

1 state detection unit
1.1 traffic situation detection unit
1.2 vehicle state detection unit
1.3 vehicle subsystem detection unit
2 database unit
2.1 static database module
2.2 dynamic database module
2.3 data management module
3 control and evaluation unit
3.1 calculation module
3.2 assessment module
4 actuation unit
5 braking system

The invention claimed is:

1. A vehicle state control system, comprising:

a state detection unit, a database unit, a control and evaluation unit, and an actuator unit;

said state detection unit being configured for providing state data, the state data being traffic situation data, vehicle state data or vehicle subsystem data;

said state detection unit including a traffic situation detection unit being configured for recording the traffic situation data and for providing the traffic situation data in a transmittable form, a vehicle state detection unit being configured for recording the vehicle state data and for providing the vehicle state data in a transmittable form, and a vehicle subsystem detection unit being configured for recording the vehicle subsystem data and for providing the vehicle subsystem data in a transmittable form;

said database unit being data-linked to said state detection unit, said database unit including a static database module, a dynamic database module and a data management module, said static database module including static data on cause-effect relationships to emissions not associated with the drivetrain, said dynamic database module including variable data on emissions not associated with the drivetrain, said data management module being configured for writing the variable data into the dynamic database module or deleting the variable data and, being configured for retrieving the static data from said static database module and the variable data from the dynamic database module and for providing the static and variable data in a transferable form as database data;

said control and evaluation unit being data-linked to said state detection unit and said database unit, said control and evaluation unit being configured for receiving the state data from said state detection unit and the database data from said database unit and for providing a plurality of alternative preliminary control commands from the state data and the database data, and predictive emission parameters for emissions not associated with the drivetrain being assigned to the alternative preliminary control commands, said plurality of alternative preliminary control commands providing different control commands calculated for the same state that are available in parallel for evaluation;

said control and evaluation unit including a calculation module being configured for calculating an emission budget of a driving unit for emissions not associated with the drivetrain from the state data and the database data and for using the emission budget for determining target emission parameters for emissions not associated with the drivetrain for each of the preliminary alternative control commands, said control and evaluation unit including an assessment module being configured for selecting a final control command from the plurality of alternative preliminary control commands by a comparison of the predictive emission parameters with the target emission parameters for each of the alternative preliminary control commands, and said control and evaluation unit being configured for outputting the final control command to said actuator unit, said actuator unit for influencing a vehicle state;

wherein said emissions not associated with the drivetrain are non-engine particle emissions caused by the vehicle that are not directly produced in an engine combustion process that includes particle emissions of a friction brake and a tire surface of the vehicle.

2. The vehicle state control system according to claim 1, wherein the system is a system according to SAE Level 2 to 5.

3. The vehicle state control system according to claim 1, wherein the vehicle subsystem is at least one of a braking system or a tire system.

4. The vehicle state control system according to claim 3, wherein the vehicle state is influenced by the braking system as a deceleration.

5. The vehicle state control system according to claim 1, wherein said control and evaluation unit and said database unit define a structural unit.

6. The vehicle state control system according to claim 1, wherein data is written to a status history in the dynamic database.

7. The vehicle state control system according to claim 1, wherein said control and evaluation unit is configured to use the state data to assess an emission-related degree of fulfilment of a previous final control command and to update the variable data with the data management module.

8. A road vehicle, comprising:

the vehicle state control system according to claim 1 and a friction brake.

9. A method for vehicle state control with a vehicle state control system, comprising;

providing the vehicle state control system according to claim 1; and including the following process steps:

a) writing static data as parametrization into the static database module;

b) recording state data with the state detection unit and providing the state data for transmission;

c) obtaining state data from the state detection unit and database data from the database unit with the control and evaluation unit;

d) providing alternative preliminary control commands and assigning predictive emission parameters for emissions not associated with the drivetrain to the alternative preliminary control commands with the control and evaluation unit, the emissions not associated with the drivetrain being non-engine particle emissions caused by the vehicle that are not directly produced in an engine combustion process that includes particle emissions of a friction brake and a tire surface of the vehicle;

e) calculating an emission budget of a driving unit for emissions not associated with the drivetrain from the state data and the database data;

f) calculating target emission parameters from the emission budget;

g) selecting a final control command from the alternative preliminary control commands by comparing the predictive emission parameters and the target emission parameters;

h) outputting the final control command to the actuator unit and affecting a vehicle state; and i) at least one of writing or deleting variable data of the dynamic database module with the data management unit.

10. The vehicle state control method according to claim 9, comprising:

repeating execution of the process steps a) to i); and including the following additional process steps:

j) recording actual emission parameters from final control commands already issued in the driving unit;

k) including the actual emission parameters in the emission budget and calculating a residual emission budget for a residual driving unit;

(l) calculating updated target emission parameters from the residual emission budget; and (m) selecting the final control command from the alternative preliminary control commands by a comparison of the predictive emission parameters with the updated target emission parameters.

* * * * *